Figure 1:
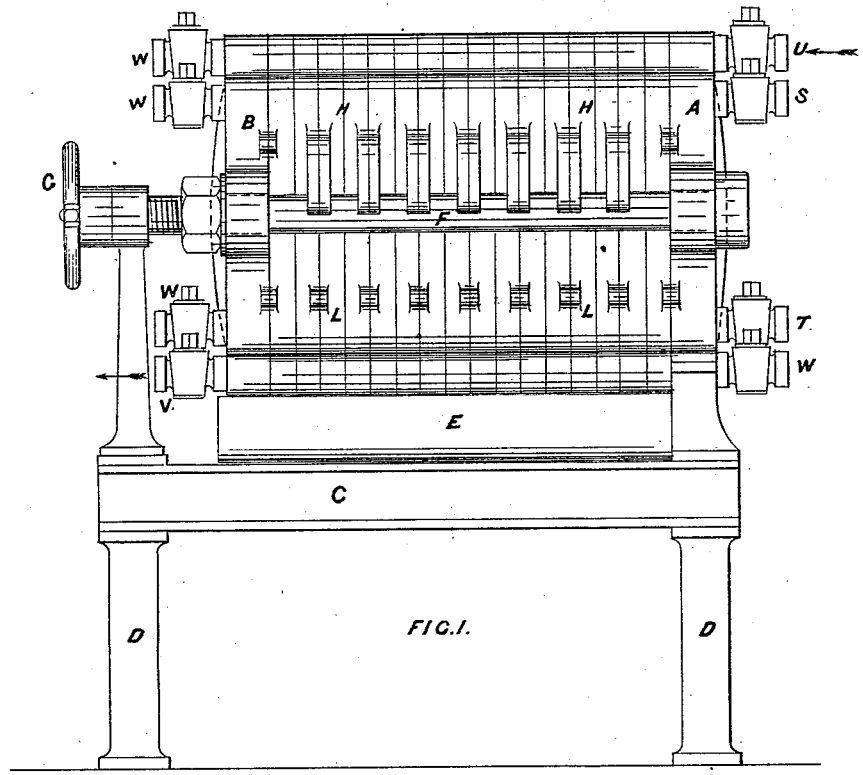

3 Sheets—Sheet 1.

W. NEEDHAM, J. KITE, & J. KITE, 2d.
Apparatus for Filtering Semi-Fluids under Pressure.
No. 213,236. Patented Mar. 11, 1879.

Witnesses.
W. A. Bertram
L. H. Barclay

Inventors.
William Needham
James Kite
James Kite, Secundus
by R. D. Williams, Atty.

N. PETERS, PHOTO-LITHOGRAPHER, WASHINGTON, D. C.

3 Sheets—Sheet 2.

W. NEEDHAM, J. KITE, & J. KITE, 2d.
Apparatus for Filtering Semi-Fluids under Pressure.
No. 213,236. Patented Mar. 11, 1879.

Witnesses,
W. A. Butram
Dr. C. H. Barclay

Inventors.
William Needham
James Kite
James Kite, secundus
by L. W. Williams Atty.

N. PETERS, PHOTO-LITHOGRAPHER, WASHINGTON, D. C.

3 Sheets—Sheet 3.

W. NEEDHAM, J. KITE, & J. KITE, 2d.
Apparatus for Filtering Semi-Fluids under Pressure.
No. 213,236. Patented Mar. 11, 1879.

Witnesses
W. A. Bertram
Dr L. K. Barclay

Inventors,
William Needham
James Kite
James Kite secundus
by R. D. Williams
Atty

UNITED STATES PATENT OFFICE.

WILLIAM NEEDHAM, JAMES KITE, AND JAMES KITE, 2D, OF VAUXHALL, ENGLAND.

IMPROVEMENT IN APPARATUS FOR FILTERING SEMI-FLUIDS UNDER PRESSURE.

Specification forming part of Letters Patent No. 213,236, dated March 11, 1879; application filed July 23, 1878.

*To all whom it may concern:*

Be it known that we, WILLIAM NEEDHAM, JAMES KITE, and JAMES KITE, 2d, all of Vauxhall, in the county of Surrey, in the Kingdom of Great Britain, engineers, have invented certain new and useful Improvements in Apparatus for Filtering Semi-Fluids under Pressure; and we hereby declare the same to be fully, clearly, and exactly described as follows:

Our invention relates to a means of applying heat or cold to semi-fluids or other matters under treatment in a high-pressure filter-press at the time of filtration.

On either side of the filter-chambers of a filter-press we have hollow frames or jackets, so constructed that a refrigerating-fluid can have free circulation through the hollow frames or jackets. When heat is required a hot fluid, steam, or hot air is circulated through the hollow frames or jackets.

Our invention relates to improvements in the construction of filter-presses, so that any liquid can be filtered at a high temperature or the temperature reduced below freezing-point in the filter-press by the aid of an ice-making machine. By this mode of construction continuous circulation can be effected through the filter-press from back to front, and the flow of the refrigerating-fluid regulated or steam used to draw off the filtered material at the temperature required.

The means which we adopt is that of circulating heat or cold within the filter-press or filtering apparatus in hollow frames or jackets, or in tubes, in such a manner that, however numerous may be the filtering-chambers, the matter under filtration may be maintained at the same temperature in each chamber or compartment throughout the entire filter-press or filtering apparatus.

Among the numerous matters which it has long been desired to filter in a high-pressure filter-press at certain temperatures, we may mention (and more particularly) the abstraction of all stearine from lubricating-oils at low temperatures, (which is so valuable in the manufacturing of clock-oils,) producing a non-congealable oil below freezing-point; and in the case of filtering dirty fats, we have the power of keeping the filter-press at a uniform heat without the steam or hot air coming into contact with the material being filtered, the issue of which from the filter-press free from stearine is to be secured only by filtration in a high-pressure filter-press within certain degrees of temperature.

After many experiments the method of applying our invention to which we give preference is that which we will now proceed to describe, reference being had to the accompanying sheets of drawings, and to the figures and letters of reference placed thereon, similar letters of reference being placed upon and denoting similar parts in each of the figures, respectively.

Figure 2:
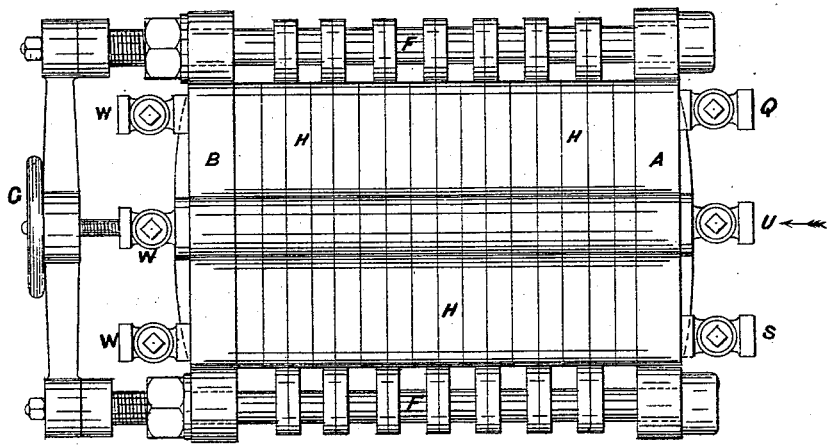
Figure 3:
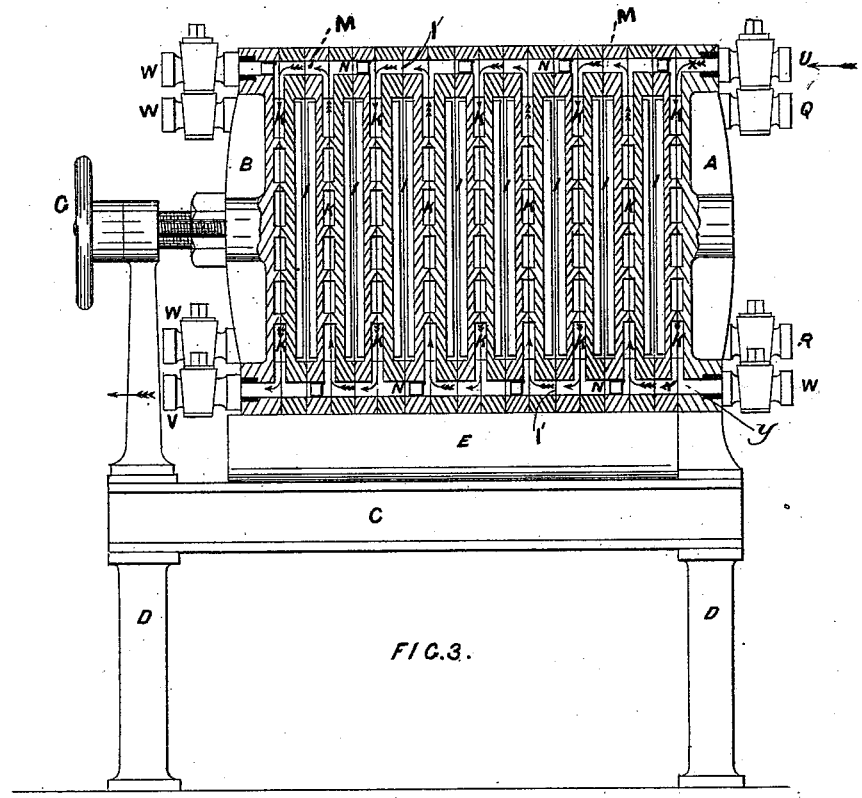
Figure 4:
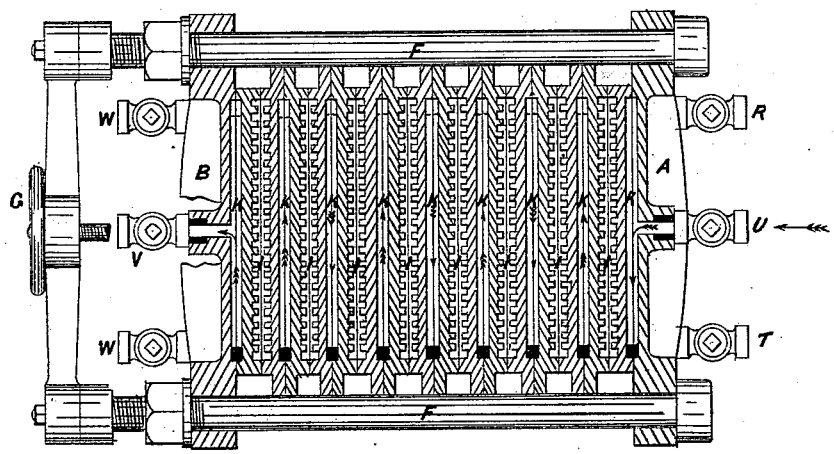
Figure 5:
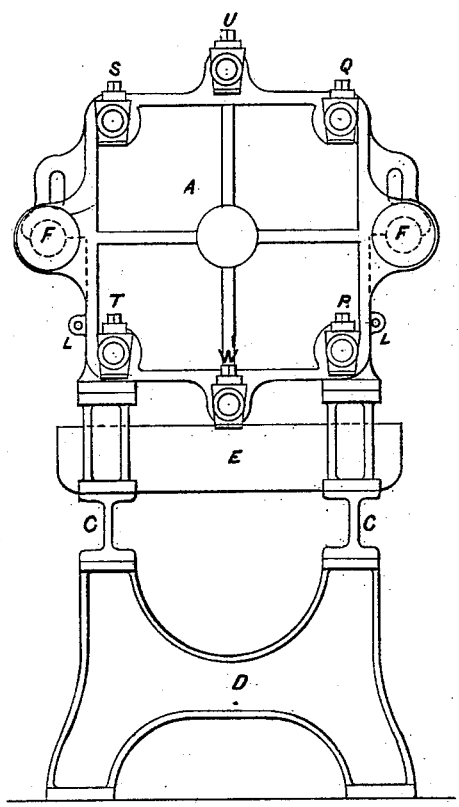
Figure 6:
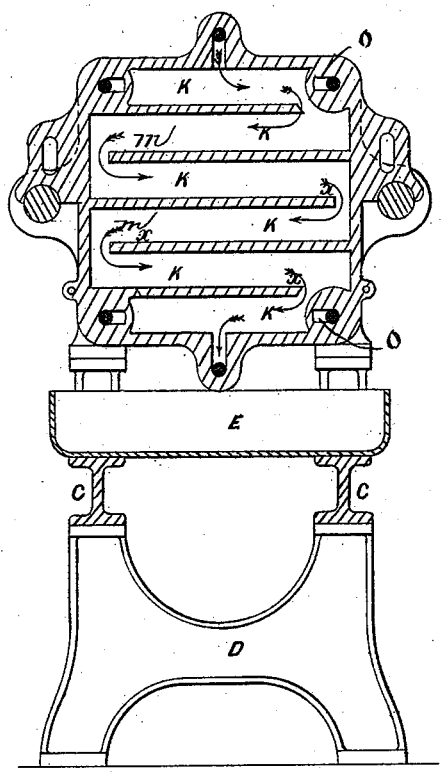
Figure 7:
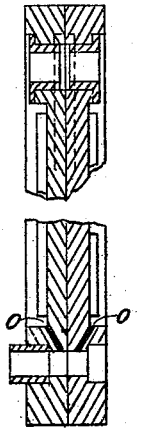

Figure 1 illustrates a side elevation of a filter-press when closed and ready for working. Fig. 2 is a top plan of the same. Fig. 3 is a vertical longitudinal section through the above. Fig. 4 is a horizontal longitudinal section. Fig. 5 is an end view of the device. Fig. 6 represents a section through one pair of slabs or plates, showing the construction of the channel or passage for the refrigerating-liquor to flow through. Fig. 7 illustrates the various details, drawn to an enlarged scale.

Fig. 2 represents a general plan of the filter-press, as seen from above; Fig. 4, a sectional plan of the same, A being the front or head plate. B is the back or end plate; C C, side frames or bearers; D D, standards for carrying same. E is a receiving-tray, and is used for receiving any leakage in opening the filter-press, but does not receive any of the filtered liquid; F F, tie-rods. G is a hand-wheel, attached to a coarse screw, to govern the heavy front plate, B, to draw it backward or forward to open or shut the filter-press; H H, hollow slabs or plates, secured together in pairs, within which a passage or channel, K K, is formed by means of the fillets or facings $x\ x$ for the refrigerating-liquor to pass through, the outer faces, I I, being ribbed to form filtering-chambers, the said ribs being designed to hold the filter-cloths out of contact with the faces of the plates; L L, lugs for bolting plates together; M, ports leading from one chamber to another; N, back valves, to divert the flow of the liquor; O O, passages leading from the filtering-chambers I I to the outlet T; P, coupling, forming passage for liquor, and for securing filtering-cloths I'; Q, inlet for the liquor to be filtered. In this filter-press the pressure for filtering is obtained from the material being pumped into the filter-chambers by a force-pump fitted with a safety-valve to regulate the pressure and to prevent bursting the filter-press, which forces out the liquid parts and leaves the solid in the chambers I I in the form of a hard cake. R, outlet for same; S, inlet for steam or hot or cold water, for washing, to filtering-chambers I I; T, outlet for the filtered or bright liquor, (after it has been forced out of the filter-chambers.) The one outlet serves for all the chambers, as they are all connected together. U, inlet for refrigerating-liquor; V, outlet for refrigerating-liquor; W W, drain-cocks, also for the purpose of opening the back valves, N, by means of a rod before opening the filter-press; X, upper passage; Y, lower passage.

In Figs. 3, 4, and 6 the passage of the refrigerating or heating liquid through the filter-press is indicated by the direction of the arrows.

The liquor entering at U passes through the pasage X into and down the first refrigerating-chamber, through the channels K K K to the bottom passage, Y, whence it is diverted in an upward direction and through the second refrigerating-chamber by means of the back valve, N, and so on.

We would here observe that, although, as aforesaid, we give preference to the arrangements above described and shown on the drawings for attemperating the matter under filtration, we may nevertheless bring heat or cold to bear upon matters while under filtration in filtering presses or apparatus otherwise arranged. For example, in lieu of forming refrigerating or heating chambers by recessing the backs of the filtering-slabs, we might place a worm, or a series of tubes, or a hollow chamber within the actual filtering-chamber, connecting these worms, tubes, or chambers in any convenient way, so that the heating or cooling medium may maintain a uniform temperature throughout the filter-press, as with the arrangement shown on the drawings.

For refrigerating we use any suitable uncongealable fluid or matter, such as glycerine, and for heating we use steam, hot air, hot water, or any suitable heating medium.

We need scarce observe that we do not, in the filter-press we have shown on the drawings, confine ourselves to any of the precise details, dimensions, or shape of the several parts, as such may be greatly varied while retaining all its distinctive features.

Having described and ascertained the nature of our said invention, and in what manner the same is or may be carried into effect, what we claim as secured to us by the hereinbefore in part recited Letters Patent is—

1. In a filter-press, a series of chambers provided with fibrous or porous septa, and having a corresponding series of contiguous chambers for an attemperating medium, as set forth.

2. In a filtering-press, the slabs or plates having one face forming part of the filtering-chamber, and the other part of the cooling or heating chamber, in combination, substantially as hereinbefore described and shown.

3. In a filter-press, a series of plates adapted to be secured together in pairs, and having upon their faces, respectively, a series of longitudinal ribs and transverse fillets, as set forth.

WM. NEEDHAM.
JAMES KITE.
JAMES KITE, 2D.

Witnesses:
HENRY KITE,
EDWIN NEWCOMB.